Feb. 6, 1968  G. MICKAS  3,367,069
FORM WHEEL GEAR GRINDER
Filed Jan. 28, 1965  6 Sheets-Sheet 1

INVENTOR
GEORGE MICKAS
BY
Bower & Patalidis
ATTORNEYS

Feb. 6, 1968    G. MICKAS    3,367,069
FORM WHEEL GEAR GRINDER
Filed Jan. 28, 1965    6 Sheets-Sheet 2

INVENTOR
GEORGE MICKAS
BY
Bower & Patalidis
ATTORNEYS

Feb. 6, 1968 G. MICKAS 3,367,069
FORM WHEEL GEAR GRINDER
Filed Jan. 28, 1965 6 Sheets-Sheet 4

INVENTOR
GEORGE MICKAS
BY
Bower & Patalidis
ATTORNEYS

Feb. 6, 1968   G. MICKAS   3,367,069
FORM WHEEL GEAR GRINDER
Filed Jan. 28, 1965   6 Sheets-Sheet 5

INVENTOR
GEORGE MICKAS
BY
Bower & Patalidis
ATTORNEYS

Feb. 6, 1968

G. MICKAS 3,367,069

FORM WHEEL GEAR GRINDER

Filed Jan. 28, 1965

INVENTOR
GEORGE MICKAS
BY
Bower & Patalidis
ATTORNEYS

United States Patent Office 3,367,069
Patented Feb. 6, 1968

3,367,069
FORM WHEEL GEAR GRINDER
George Mickas, Grosse Pointe Woods, Mich., assignor to Michigan Tool Company, Detroit, Mich., a corporation of Delaware
Filed Jan. 28, 1965, Ser. No. 428,716
4 Claims. (Cl. 51—232)

ABSTRACT OF THE DISCLOSURE

A gear grinder for helical and spur gears including a reciprocating work table with a rotary work spindle having an index plate engaged by a pawl on an arm. The arm is operatively connected to a stationary adjustable cam track by means of a slide and cam follower which moves over the track upon movement of the table thus rotating the workpiece on the spindle to provide a helix on the workpiece. An adjusting screw and reversible motor between the slide and cam follower provide an adjustment of the rotary position of the spindle and workpiece through the slide and pawl. Compensating structure is also provided to relieve the variations in frictional forces on the spindle which might cause unequal grinding on opposite tooth flanks of the gear.

---

This invention relates to form wheel gear grinders, and more particularly to the spindle head and work roll assemblies on grinders for producing precision external and internal helical and spur gears.

It is an object of the invention to provide a novel and improved form wheel gear grinder in which fine angular adjustment of the work with respect to the grinding wheel may be accomplished while the work table is reciprocating and the operator stands in full view of the grinding wheel and work, and is thus able to observe the engagement of the grinding wheel with the tooth flanks.

It is another object to provide a novel and improved gear grinder of this nature which is especially adapted for grinding helical gears, and includes an adjustable sine bar arrangement together with compensating means which insures equal grinding of both tooth flanks during both portions of the reciprocating work table stroke.

It is another object to provide an improved gear grinder of this character which is adapted for fully automatic operation and may be used for internal and external gears of relatively large diameters.

Other objects, features and advantages of the present invention will become apparent from the subsequent description, taken in conjunction with the accompanying drawings.

Figure 1:
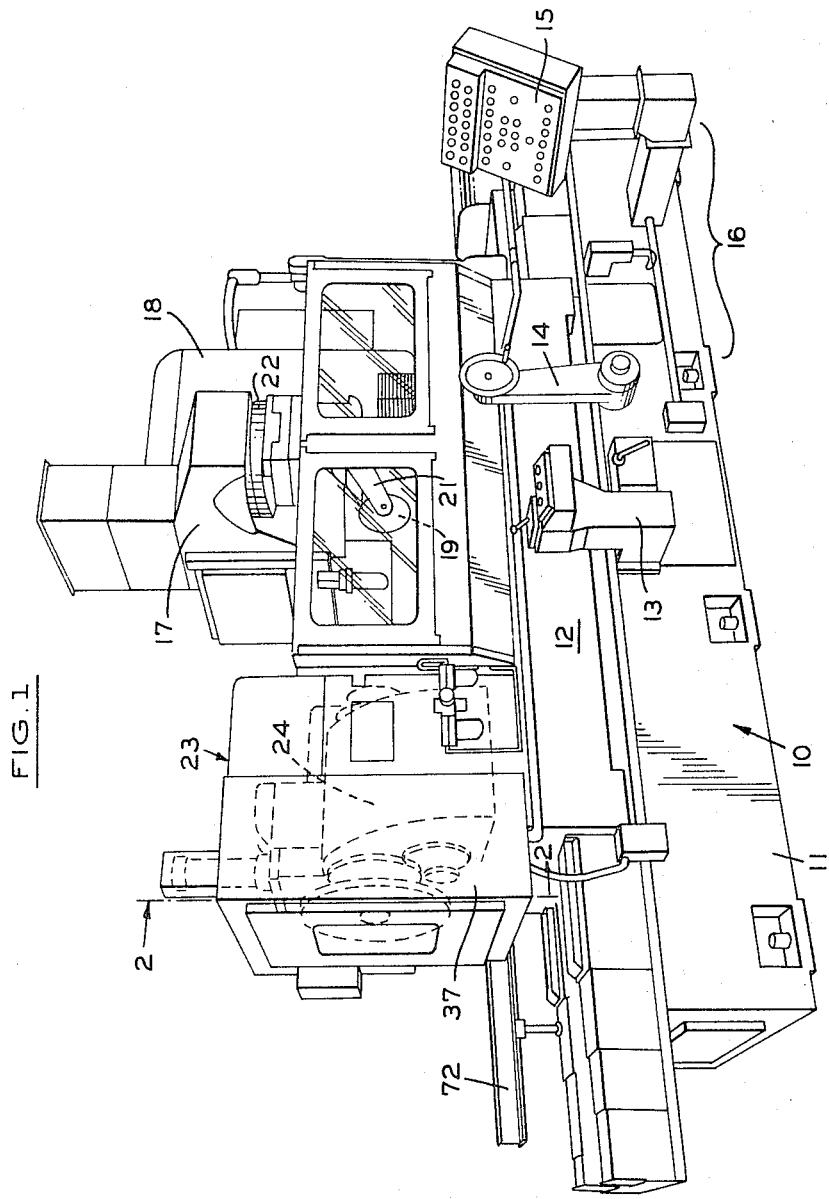
FIGURE 1 is a perspective view in elevation of a form wheel gear grinder embodying the principles of the invention.

Briefly, the illustrated embodiment of the invention forms a portion of a form wheel gear grinder of the type having a reciprocating work table, with the work being supported by one end of a spindle carried by a head stock assembly which is mounted on the table. An index plate is keyed to the other end of the spindle, and an arm is rotatably mounted on the spindle and carries a pawl engageable with the tooth spaces on the index plate. The number of teeth on the index plate corresponds to those on the work, the plate being interchangeable for different workpieces. A coarse position locater assembly for the index plate is mounted on the table, being connectible to the index plate by gearing and a selectively actuatable clutch, so that the work may be indexed when the pawl is withdrawn from the index plate.

The arm carrying the pawl is actuatable by a vertically movable slide carried by a column mounted on the table adjacent the spindle housing assembly. The slide is connected to the pawl arm by two sets of bands which connect the slide to a hub which carries the pawl arm.

The vertical position of the slide is govered by a sine bar, this bar comprising a track mounted on the table alongside the work roll assembly housing and adjustable to various inclinations. A cam follower is secured to the slide and rests on this track. The means for securing the cam follower to the slide comprises a vertically disposed adjusting screw, the screw being rotatably connected to the slide and threadably connected to a nut carried by the cam follower. A reversible motor carried by the slide is connected through a gear box to this adjusting screw, and the operation of the motor is controlled by an operator standing in front of the machine where he can observe the manner in which the grinding wheel contacts the work. The slide is partially counterweighted but is urged by gravity against the track. Rotation of the motor will therefore cause vertical movement of the slide with respect to the table, thus rotatably adjusting the pawl arm and therefore the index plate and the work spindle. The fine adjustments permitted by this mechanism will enable the operator to make sure that both flanks of each tooth space are being equally ground, even while the table is reciprocating, and without the necessity of the operator leaving his work station or mounting gauges or other apparatus on the work.

The invention also includes a compensator in the form of a reciprocating motor mounted at the top of the column which supports the work roll assembly slide, this motor being connected between the column and the slide so that it may exert a variable force in a downward direction on the slide. During operation, when the cam follower is descending the sine bar, this motor may be used to exert a predetermined downward force on the slide, this force biasing the work spindle in one direction. When the cam follower is ascending the sine bar, the force exerted by this motor may be relieved. It has been found that this device will compensate for the variation in frictional forces on the spindle and stresses in the bands which connect the slides to the pawl arm hub, which variations might otherwise cause unequal grinding on the opposite tooth flanks during the two portions of each reciprocating work table stroke.

Referring more particularly to the drawings, a form wheel gear grinder is shown in FIGURE 1, being generally indicated at 10. The grinder comprises an elongated base 11 and a table 12 mounted on base 11 for longitudinal movement, that is, movement to the left and right as shown in FIGURE 1. This figure also shows a control station 13, wheel head control means 14 and a push-button console 15 mounted adjacent the operator's station, which is in the area marked 16 of FIGURE 1.

A wheel head support 17 is mounted for vertical movement on a column 18 in front of the operator's station and carries a grinding wheel 19 which is supported by an arm 21. The reference numeral 22 indicates the means for adjusting the wheel head helix angle about a vertical axis.

Figure 2:
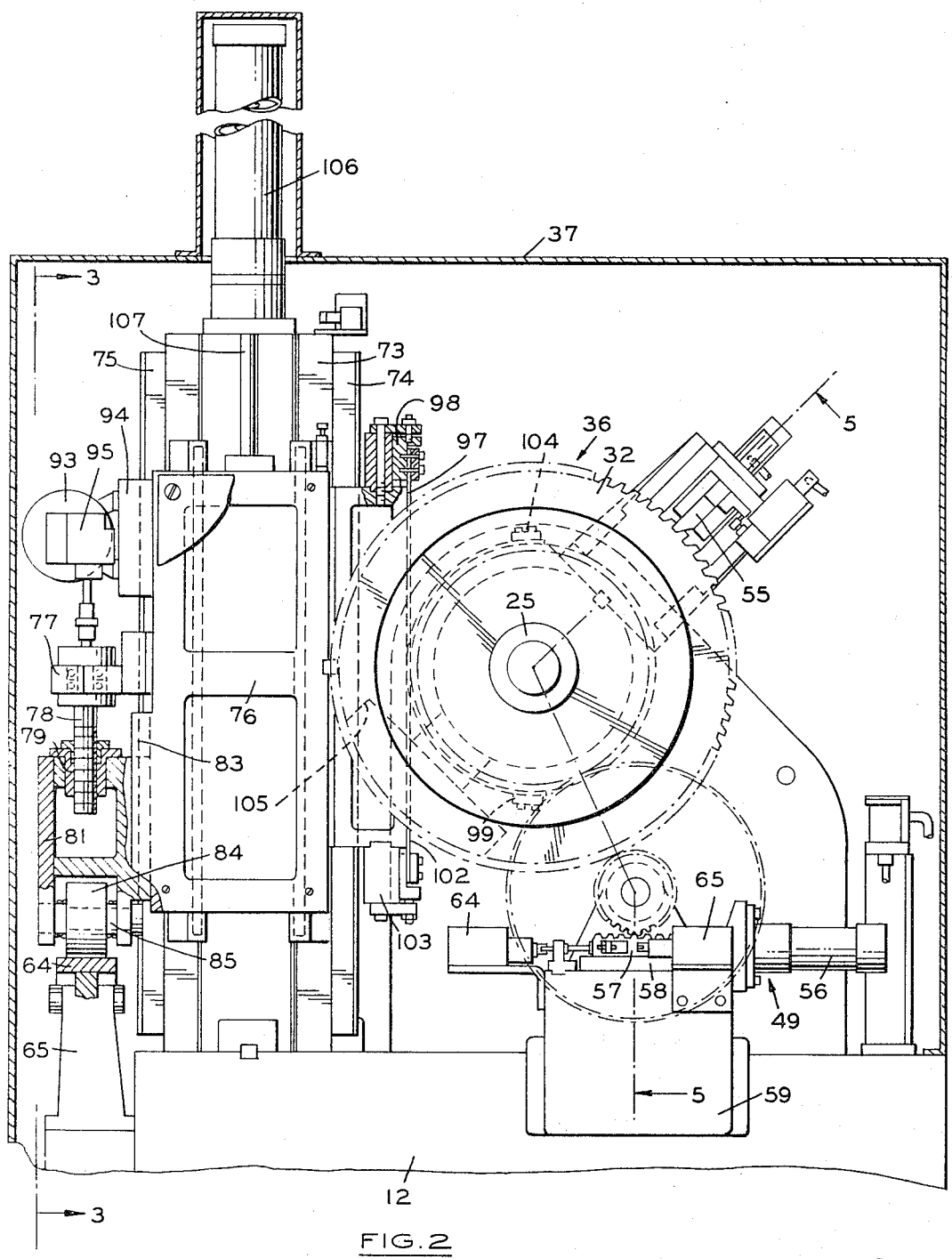
FIGURE 2 is an end elevational view of the structure enclosed by the work roll assembly housing, taken along the line 2—2 of FIGURE 1.
Figure 3:
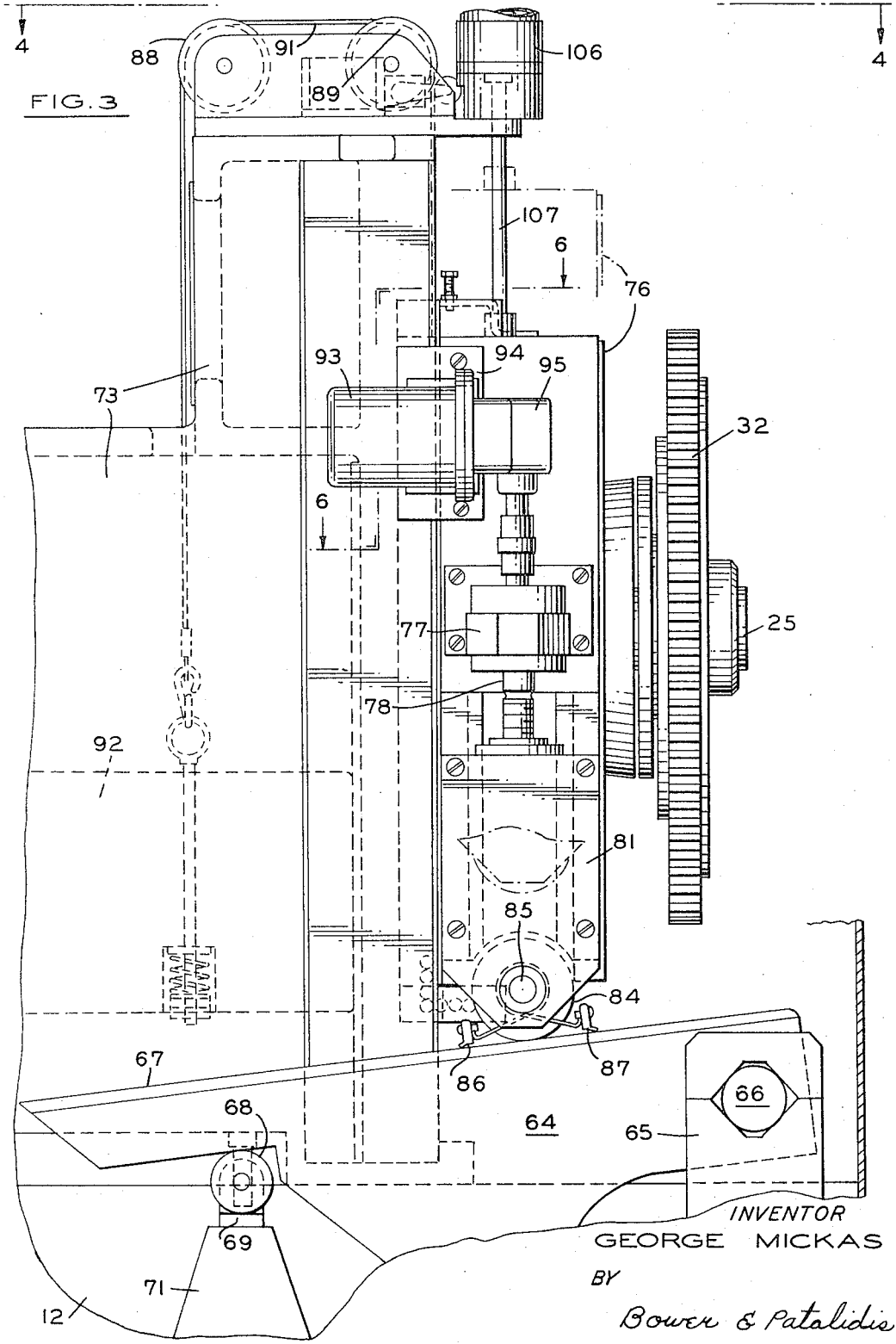
FIGURE 3 is a side elevational view of the work roll assembly and sine bar, taken along the line 3—3 of FIGURE 2.
Figure 5:
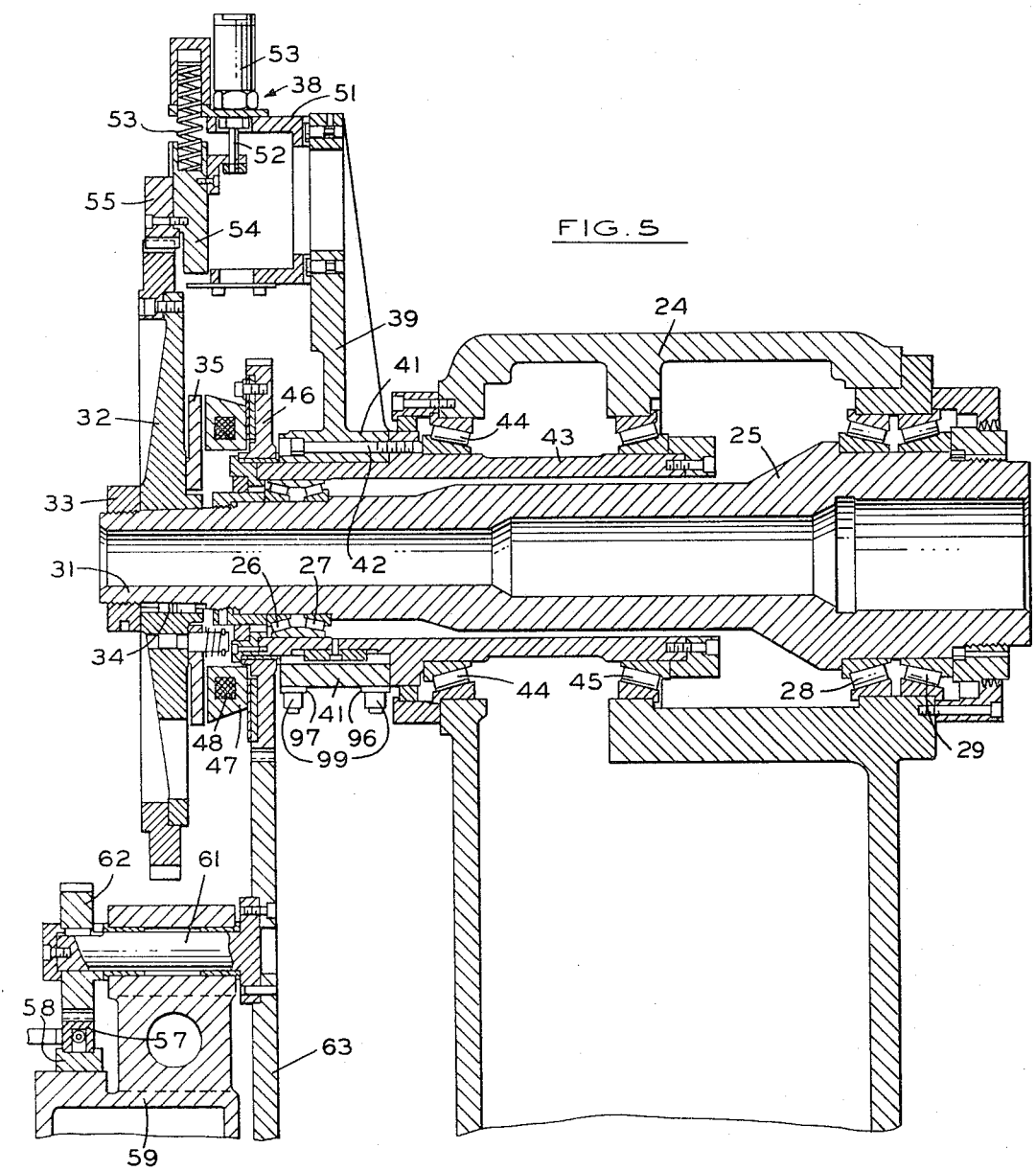
FIGURE 5 is a cross-sectional view of the index plate and pawl as well as the coarse position locater assembly, taken along the line 5—5 of FIGURE 2.

The head stock assembly is generally indicated at 23 and comprises a spindle housing 24 mounted on and reciprocable with table 11. Housing 24 rotatably supports a work spindle 25, as seen in FIGURE 5, this support being through bearings 26, 27, 28 and 29. Of these, bearings 28 and 29 are supported directly by housing 24, and bearings 26 and 27 indirectly by the housing, through means later described. Spindle 25 extends outwardly from both ends of housing 24, the work being mountable on the right hand end of the spindle, as seen in FIGURE 5. The other end 31 of shaft 25 is tapered, and an index plate 32 is mountable thereon. As seen in FIGURES 2 and 3, this plate is provided with serrations or teeth corresponding in number to the teeth to be formed on the workpiece. Plate 32 is held in position by a nut 33 threadably mounted on shaft 25, and is non-rotatably connected to the shaft by a key 34. A driven clutch element 35 is secured to the inside of index plate 32, as seen in FIGURE 5. Index plate 32 is interchangeable with other index plates of equal diameter but having a different number of teeth to correspond with different workpieces.

The index plate forms part of a work roll assembly which is generally indicated at 36 in FIGURE 2 and is enclosed by a work roll assembly housing 37 carried by table 12. The purpose of the work roll assembly is to impart a predetermined degree of angular rotation in one direction to work spindle 25 while work table 12 is moving in one direction, and the opposite rotational movement to spindle 25 when the table reverses its direction, so that the tooth spaces of helical gears may be ground along the entire flanks.

The means for rotating index plate 32 comprises a pawl assembly generally indicated at 38 in FIGURE 5. This assembly is secured to a pawl arm 39 extending from a hub 41, this hub being secured by bolts 42 to a pawl arm supporting shaft 43. Shaft 43 surrounds an intermediate portion of work spindle 25, and a portion thereof is rotatably supported within spindle housing 24 by bearings 44 and 45. Bearings 26 and 27, which help support spindle 25, are disposed within an end portion of shaft 43. This end portion of the shaft also rotatably supports a gear 46, and a driving clutch element 47 is secured to this gear and faces clutch element 35. Clutch elements 35 and 47 comprise an electromagnetic clutch, the coil 48 of which is within element 47. This clutch is normally disengaged but upon energization of coil 48, elements 47 and 35 will be operatively connected. Gear 46 is driven by an index plate coarse position locater assembly generally indicated at 49, the details of this assembly being described below.

Pawl assembly 38 comprises a bracket 51 secured to the outer end of arm 39, this bracket carrying a plunger 52 operated by a solenoid 53. A member 54 is secured to plunger 52 and is urged by a helical coil compression spring 53 in a radially inward direction. A pawl 55 is secured to member 54 and is engageable with any of the interdental spaces on index plate 32 upon deenergization of solenoid 53, thus locking pawl arm 39 to the index plate. Upon energization of solenoid 53, pawl 55 will be withdrawn from index plate 32, permitting relative rotational movement between the index plate and pawl arm.

Index plate coarse position locater assembly 49 is mounted on table 12 and comprises a reciprocable fluid motor 56, seen in FIGURE 2, which actuates a rack 57 supported by a horizontal track 58. Track 58 is supported by a bracket 59 mounted on table 12, and this bracket rotatably supports a shaft 61, as seen in FIGURE 5, the axis of which is parallel to that of spindle 25. Rack 57 meshes with a gear 62 secured to one end of shaft 61, the other end carrying a larger gear 63 which meshes with gear 46. Limit switches 64 and 65 are provided for defining the extremities of motion of rack 57. With clutch coil 48 energized and clutch elements 47 and 35 connected, and with pawl 55 withdrawn from index plate 32, movement of rack 57 will result in rotation of the index plate and therefore of work spindle 25. When the next interdental space on the index plate is approximately aligned with pawl 55, solenoid 53 may be deenergized, locking pawl arm 39 to the index plate.

The means for rotating pawl arm 39 comprises a sine bar 64, seen in FIGURE 3, this bar being carried by table 12 and connected to pawl arm 39 by means to be described. More particularly, a bracket 65 is carried by table 12, and one end of sine bar 64 is pivoted thereto by means of a pivot 66. The upper surface 67 of the sine bar is flat, and the underside of the sine bar remote from pivot 66 carries a circular member 68 adapted to rest on a gauge block 69 carried by a pedestal 71 on table 12. Sine bar 64 is disposed on one side of head stock assembly 23, and a horizontal track 72 carried by table 12 may be provided in contiguity with the pivoted end of the sine bar. The slope of surface 67 will be determined by the height of the gauge block or blocks 69, mounted on pedestal 71, this slope being chosen to correspond with the desired angular roll of spindle 25 as table 12 reciprocates. Sine bar 64 may thus be considered as a track of variable inclination.

Figure 4:
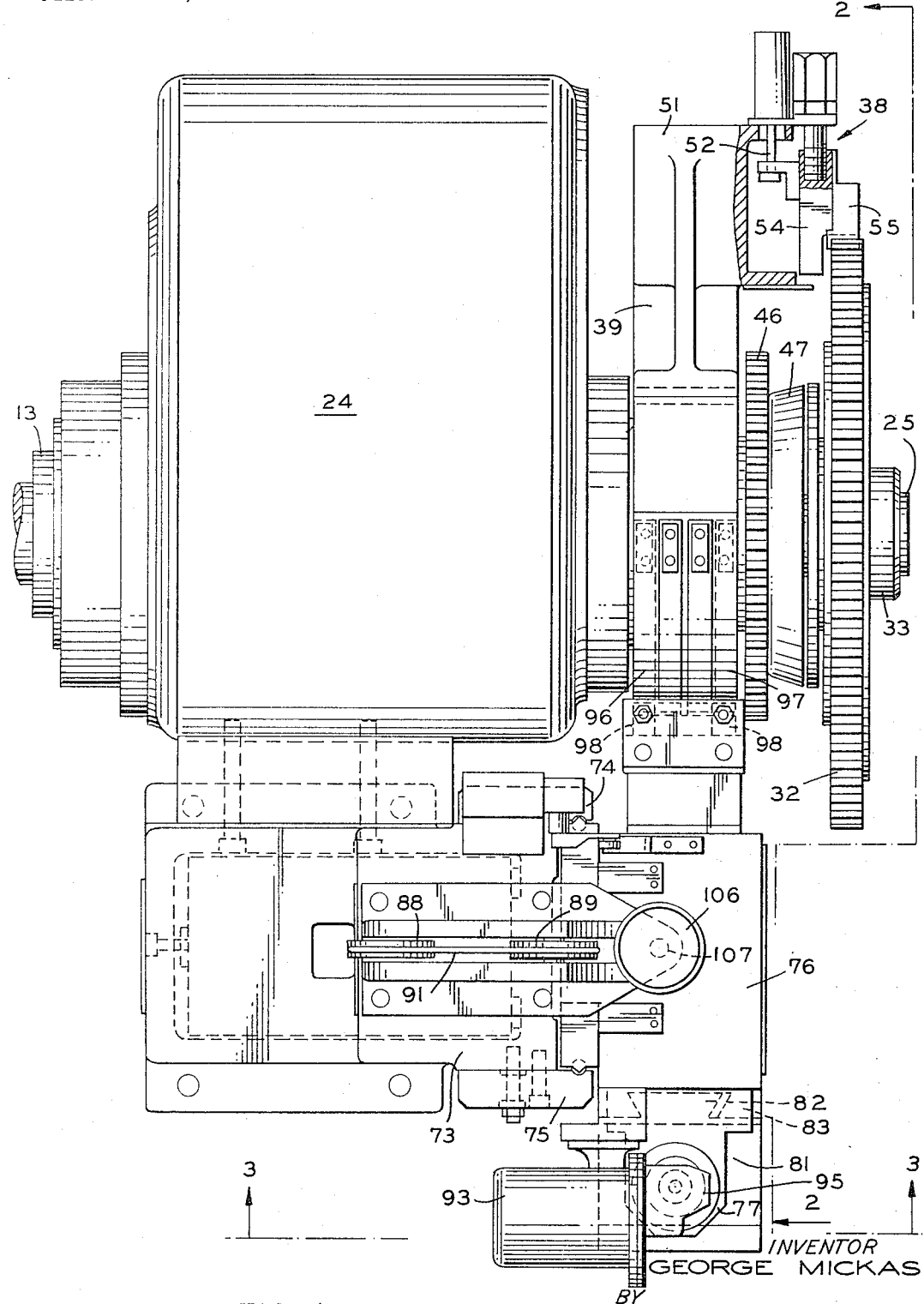
FIGURE 4 is a top plan view of the work roll assembly taken along the line 4—4 of FIGURE 3.

A column 73 is mounted in table 12 between sine bar 64 and spindle housing 24, as seen in FIGURE 2. A pair of facing vertically extending tracks 74 and 75 are mounted on column 73, and a slide 76 is guided by these tracks for vertical movement. A bracket 77 extends outwardly from the intermediate portion of the slide 76, as seen in FIGURE 2, this bracket being above sine bar 64. A screw 78 is rotatably but non-slidably mounted on bracket 77, and the threaded lower end of this screw is engageable with a bushing 79 carried by a cam follower support or bracket 81. This support or bracket has a dovetail slide 82 on one side thereof, as seen in FIGURE 4, the slide being vertically movable in a track 83 on the outer lower portion of slide 76. A cam follower comprising a roller 84 is rotatably mounted by means of a pin 85 on the forked lower end of support or bracket 81, and rests on surface 67 of sine bar 64. A pair of spring-mounted wipers 86 and 87 may be carried by pin 85 for removing foreign particles from surface 67.

A pair of pulleys 88 and 89 are mounted at the top of column 73, as seen in FIGURE 4, and a cable 91 is supported by these pulleys, one end of the cable being secured to slide 76 and the other to a counterweight 92 within a hollow portion of the column, as seen in FIGURE 3. The relative weights of slide 76 and its attached parts on the one hand, and counterweight 92 on the other, are such that some, but not all, of the weight of the former will be counterbalanced. Sufficient uncompensated weight will remain to cause cam follower 84 to engage sine bar 64 with some force, this force being transmitted from slide 76 through bracket 77, screw 78, bushing 79 and cam follower support 81 to cam follower 84.

Means are provided for finely adjusting the height of slide 76 relative to table 12, this fine adjustment in turn permitting a fine angular adjustment of work spindle 25, as will be seen below. The fine adjustment means comprises a selectively actuatable, reversible electric motor 93, this motor being secured to the cover portion of slide 76 above screw 78, by means of a bracket 94. The shaft of motor 93 is horizontally disposed, and is connected by means of a right angle gear box drive 95 to the upper end of screw 78. The rotation of motor 93 may be controlled by buttons on console 15. It will thus be seen that by jogging motor 93 in either direction, slide 76 may be slightly raised or lowered with respect to table 12, cam follower 84 remaining in engagement with sine bar 64.

The means for connecting slide 76 with pawl arm 39 comprises two sets of flexible bands extending in opposite directions. The first set of bands is indicated at 96 and 97, the upper ends of these bands being secured to the upper end of slide 76 on the side opposite that which carries fine adjustment motor 93. The means of securing bands 96 and 97 to the slide may include tape tensioners, indicated at 98 in FIGURE 2, so as to maintain proper tension in the bands. The other ends of bands 96 and 97 are secured at 99 to hub 41. The other set of bands are indicated at 101 and 102 in FIGURE 4, these bands being disposed between bands 96 and 97. The lower ends of bands 101 and 102 are secured to the lower end of slide 76 by tape tensioners 103, and the upper ends are secured to hub 41 by means indicated at 104 in FIGURES 2 and 4. It will thus be seen that downward movement of slide 76 will tension bands 101 and 102, causing counterclockwise rotation of pawl 55, as seen in FIGURE 2, while upward movement of slide 76 will tension bands 96 and 97, causing clockwise movement of pawl 55. In order that the weight of pawl assembly 38 and pawl arm 39 not exert a variable force on slide 76 as pawl arm 39 is rotated, a counterweight 105 is secured to hub 41 diametrically opposite assembly 38, as seen in FIGURE 2.

The means for compensating for variation in frictional forces on spindle 25 and stresses in the bands, comprises a reciprocable fluid motor 106 secured in a vertical position on the top of column 73. Piston rod 107 of this motor extends downwardly, and is secured to the upper end of slide 76. By applying fluid pressure to the upper end of fluid motor 106, a force may be exerted on slide 76 in a selective manner.

In operation, assuming that a workpiece (not shown) is secured to spindle 25 and the appropriate index plate 52 is mounted on end 31 of the spindle, the stroke limits of table 12 will be selected so as to cause cam follower 84 to ride either on track 72 or sine bar 64, depending upon whether a workpiece has spur or helical teeth. In order to fully explain the various elements of the invention, it will be assumed that the workpiece has helical teeth, the operation for spur teeth becoming apparent as the description proceeds. The slope of sine bar 64 will be preselected by appropriate gauge blocks 69, and pawl 55 will be caused to engage an interdental space on plate 32.

Upon reciprocation of table 12, grinding wheel 19 will begin to grind an interdental space on the workpiece. As table 12 moves to the right, cam follower 84 will ride down sine bar 64 (assuming that the sine bar slopes downwardly as shown in FIGURE 3), and the downward movement of slide 76 will cause counterclockwise rotation of pawl 55 in FIGURE 2, thus rotating spindle 25 to cause the correct roll for grinding the helical workpiece teeth. As table 12 reaches the rightward end of its stroke and begins its leftward movement, cam follower 84 will ride up sine bar 64, reversing the direction of roll. It will be apparent that by sloping sine bar 64 in a direction opposite that shown in FIGURE 3, helical gears of the opposite hand may be ground.

During the grinding, the operator, standing at work station 16, will be able to observe whether both flanks of the interdental space are being properly engaged by grinding wheel 19. If such is not the case, he may jog motor 93 in one direction or the other, while still standing at his station and without halting movement of table 12. This jogging of fine adjustment motor 93 will rotate screw 78, adjusting the height of slide 76 with respect to cam follower 84, and thus finely adjusting the roll position in an angular direction in any given position of table 12. The operator will thus be able to obtain a correct grinding position for wheel 19 without leaving his station or having to stop operation of the machine 10.

During grinding of each tooth space on a workpiece, cam follower 84 will alternately descend and ascend sine bar 64. During each ascent, compensating motor 106 will not be actuated, so that the stresses in the parts connecting cam follower 84 with pawl arm 41 will be those normally created by raising the uncompensated weight of slide 76 and its connected parts. During each descent of cam follower 84, a predetermined downward force will be exerted on slide 56 through piston rod 107 of motor 106. This force will be just sufficient to simulate the above-mentioned stresses, thus attaining the same grinding action on both tooth flanks during the descending stroke portion as was caused during the ascending portion. It should be noted that while it has been found that alternate activation and deactivation of motor 106, as described above, is an efficient way of compensating for the stress variations, the compensating means could be utilized in other ways to achieve the desired results.

After one interdental space on a workpiece has been ground, clutch coil 48 may be energized, connecting clutch elements 47 and 35, and pawl 55 withdrawn by energization of solenoid 53. Motor 56 may then be actuated to rotate index plate 32 and spindle 25 until the next interdental space on plate 32 is approximately aligned with pawl 55. The reciprocation of table 12 will be halted during indexing of the spindle. Clutch coil 48 and solenoid 53 may then be deenergized, permitting pawl 55 to re-engage the index plate. In this manner, all the workpiece teeth may be successively ground in an efficient manner with the desired accuracy and a minimum of lost time.

Figure 6:
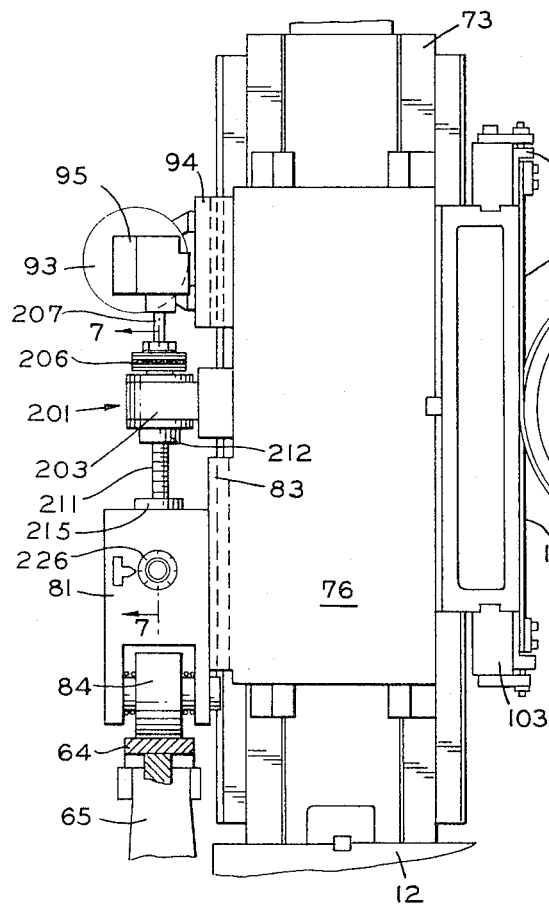
FIGURE 6 is a fragmentary elevational view of the column and slide showing a modified form of compensating means.
Figure 7:
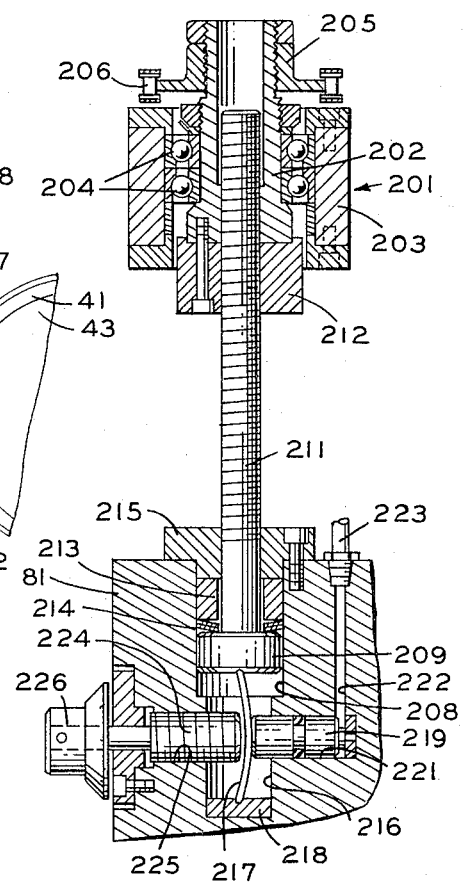
FIGURE 7 is an enlarged cross-sectional view taken along the line 7—7 of FIGURE 6 and showing the construction of the modified compensator.

FIGURES 6 and 7 show a modified form of compensating means, which differs from that shown in the previous figures mainly in that it is disposed between the slide and cam follower carriage rather than between the column and slide, and comprises a different type of motor linkage. It will be kept in mind that the purpose of the compensating means is to angularly shift the position of the work spindle for any given position of the cam follower wheel on the track or sine bar, in order to compensate for varying frictional forces which arise during reciprocation of table 12. The compensating means in FIGURES 6 and 7 is generally indicated at 201, and is disposed between the output shaft of gear box 95 and cam follower carriage 81. More particularly, the compensating means 201 comprises a nut 202 which is rotatably but non-slidably mounted within an extension 203 from slide 76 which is spaced above tracks 83, the mounting of nut 202 by means of bearings 204. Nut 202 is rotatably adjustable by means of a sprocket 205 fixed to its upper end, this sprocket being connected by a chain 206 to a similar sprocket (not visible in the figures) secured to the lower end of output shaft 207 of gear box 95.

Cam follower carriage 81 is provided with a vertically extending upwardly open bore 208 within which is disposed the head 209 of a lead screw 211. This lead screw extends upwardly from bore 208 and is threadably mounted in nut 202, an unthreaded guide member 212 being secured to the underside of nut 202 and being engageable with screw 211. A collar 213 is fixed within bore 208 immediately above head 209 and cone-shaped Belleville spring washers 214 are disposed between collar 213 and head 209. An unthreaded guide bushing 215 for screw 211 is secured to the upper end of carriage 81. A narrower bore 216 extends downwardly from bore 208, and a spring reed 217 is disposed within this bore and the lower end of bore 208. More particularly, spring reed 217 is flat in its unstressed condition, and its lower edge rests on a notched pad 218 at the lower end of bore 216. Its upper end engages a notch in the underside of head 209.

The length of reed 217 is such that, in order for it to straighten, spring washers 214 must be compressed, and by the same token, when washers 214 are in their unstressed condition, reed 217 must be bowed, as shown in FIGURE 7. The strength of washers 214 relative to the spring strength of reed 217 is such that, in the absence of lateral forces being exerted on reed 217, it will be held in the bowed position of FIGURE 7 by the force of springs 214.

A piston 219 is provided for exerting a lateral force on the central portion of reed 217 in a leftward direction, as seen in FIGURE 7, that is, in a direction which will tend to straighten it. This piston is mounted in a bore 221 in carriage 81, the left hand end of this bore being connected with bore 216 while the right hand end is connected to a passage 222 to which pressurized hydraulic fluid may be supplied by a conduit 223.

A stop 224 is disposed on the left hand side of reed 217 for limiting the leftward movement of its central portion. This stop comprises a member threadably mounted in a bore 225 coaxial with bore 221, and having an end adjacent the central portion of reed 217 but spaced therefrom. The position of stop 224 may be adjusted by a knob 226 secured to a reduced extension of stop 224 and accessible from the opposite side of carriage 81.

In operation of the compensating means shown in FIGURES 6 and 7, the shifting of slide 76, and therefore the rotation of the work spindle, will be accomplished by varying the hydraulic pressure applied to passageway 222. When no pressure is being applied, the parts will be disposed as shown in the figures, with springs 214 unstressed and reed 217 in its bowed position. When pressure is applied to passageway 222, reed 217 will be straightened, lifting screw 211 and compressing springs 214. The lifting of screw 211 will lift nut 202 and therefore slide 76. The amount of lifting may be varied by adjusting the position of stop 224.

It should be noted that the compensating means shown in FIGURES 6 and 7 will not interfere in any way with the operation of the fine adjustment means, since reversible electric motor 93 will be capable of adjusting the position of slide 76 relative to cam follower 81 by rotation of nut 202.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a form wheel gear grinder, a reciprocable table, a spindle housing carried by said table, a spindle rotatably mounted in said housing, an index plate secured to said spindle and having teeth corresponding in number to the teeth on the gear to be ground, a pawl assembly movable with said table and adjacent said index plate, a pawl on said pawl assembly, means on said pawl assembly for selectively moving said pawl radially toward and away from said index plate, whereby said pawl may enter any interdental space on said index plate or be retracted therefrom, means for adjusting the position of said pawl transversely to said direction of radial movement with relatively fine increments, whereby the angular position of said work spindle may be finely adjusted while said table is reciprocating, said fine adjustment means comprising a connection between said table and said pawl assembly, said connection being continuously variable in length in a direction transverse to the direction of table reciprocation, said connection comprising a track carried by said table and extending in the general direction thereof, a cam follower resting on said track, a column mounted on said table, a slide mounted for vertical movement on said column, counterweight means partially counteracting the weight of said slide on said cam follower, means connecting said pawl assembly to said slide for movement therewith, a lead screw and nut connection between said cam follower and slide, a reversible motor for adjusting the length of said lead screw and nut connection, said lead screw and nut connection comprising a bracket secured to said slide and rotatably supporting a lead screw, a nut secured to said cam follower and threadably receiving said lead screw, and a bracket mounted on said slide above said first-mentioned bracket and supporting said reversible motor, said motor being connected to said lead screw.

2. The combination according to claim 1, further provided with compensating means comprising a reciprocable fluid motor connected between said column and slide, said motor being selectively actuatable during the reverse movements of said table.

3. The combination according to claim 1, further provided with compensating means comprisng a connection of variable length between said lead screw and nut connection and said cam follower, and a fluid-actuated piston for varying the length of said last-mentioned variable length connection.

4. In a form wheel gear grinder, a recpirocable table, a sine bar carried by said table, said sine bar extending in the general direction of the table and being pivotally secured to the table at one end thereof, the other end of the sine bar being adjustable in height to vary the inclination thereof, a column mounted on said table adjacent said sine bar, a slide mounted for vertical movement on said column, a cam follower carried by said slide and resting on said sine bar, a spindle head on said table, a work spindle rotatably carried by said spindle head, an index plate mounted on said spindle, a pawl assembly mounted adjacent said index plate, a pawl in said pawl assembly selectively engageable with said index plate, means interconnecting said slide and pawl assembly whereby movement of said slide will cause said pawl assembly to rotate said index plate when the pawl thereof engages the index plate, and compensating means interconnecting said cam follower and slide, said compensating means being capable of exerting an upward force of preselected magnitude on said slide during table movement in either direction, whereby compensation may be made for the variation in forces on said work spindle during reciprocation of said table, said compensating means, further including a nut rotatably carried by said slide, a lead screw carried by said cam follower and threadably mounted in said nut, spring means urging said lead screw in a downward direction, a spring reed extending between the underside of said lead screw and said cam follower, the length and strength of said reed relative to the dimensions and strength of said spring means being such that said reed will be normally bowed when said spring means are unstressed, fluid operating means on one side of said reed for exerting a transverse force on the central portion of said reed, and an adjustable stop on the other side of said reed for limiting the movement thereof.

References Cited

UNITED STATES PATENTS

| | | | |
|---|---|---|---|
| 1,429,308 | 9/1922 | Wachtler | 51—123 |
| 1,791,424 | 2/1931 | Metzler | 51—232 |
| 1,835,476 | 12/1931 | Drader | 51—123 |
| 2,176,924 | 10/1939 | Olson | 51—123 X |
| 2,574,112 | 11/1951 | Kopec | 51—95 X |
| 2,688,904 | 9/1954 | Richter | 51—216 X |
| 2,794,370 | 6/1957 | Onsrud | 51—100 X |
| 2,805,526 | 9/1957 | Hill | 51—95 X |

HAROLD D. WHITEHEAD, *Primary Examiner.*